United States Patent
Zhao et al.

(10) Patent No.: US 12,546,949 B2
(45) Date of Patent: Feb. 10, 2026

(54) OPTICAL FIBER ADAPTER

(71) Applicant: ACCELINK TECHNOLOGIES CO., LTD., Wuhan (CN)

(72) Inventors: Xiaobo Zhao, Wuhan (CN); Zhechi Lu, Wuhan (CN); Ping Gu, Wuhan (CN); Benqing Quan, Wuhan (CN); Chuanbin Zhang, Wuhan (CN); Yong Luo, Wuhan (CN)

(73) Assignee: ACCELINK TECHNOLOGIES CO., LTD., Wuhan (CN)

( * ) Notice: Subject to any disclaimer, the term of this patent is extended or adjusted under 35 U.S.C. 154(b) by 382 days.

(21) Appl. No.: 18/001,062

(22) PCT Filed: Dec. 22, 2020

(86) PCT No.: PCT/CN2020/138422
§ 371 (c)(1),
(2) Date: Dec. 7, 2022

(87) PCT Pub. No.: WO2021/258688
PCT Pub. Date: Dec. 30, 2021

(65) Prior Publication Data
US 2023/0204866 A1    Jun. 29, 2023

(30) Foreign Application Priority Data
Jun. 24, 2020    (CN) .......................... 202010591832.0

(51) Int. Cl.
*G02B 6/38* (2006.01)

(52) U.S. Cl.
CPC ......... *G02B 6/3825* (2013.01); *G02B 6/3875* (2013.01); *G02B 6/3807* (2013.01); *G02B 6/3878* (2013.01)

(58) Field of Classification Search
CPC ................ G02B 6/3825; G02B 6/3874; G02B 6/3875; G02B 6/3877; G02B 6/3878; G02B 6/3879; G02B 6/3807
See application file for complete search history.

(56) References Cited

U.S. PATENT DOCUMENTS

| 5,577,145 A | * | 11/1996 | Musk | G02B 6/4292 |
| | | | | 385/88 |
| 6,273,619 B1 | * | 8/2001 | Shahid | G02B 6/3874 |
| | | | | 385/70 |
| 7,118,284 B2 | * | 10/2006 | Nakajima | G02B 6/3807 |
| | | | | 385/53 |
| 10,302,875 B1 | | 5/2019 | Yang | |

(Continued)

FOREIGN PATENT DOCUMENTS

| CN | 101526649 A | 9/2009 |
| CN | 202057832 U | 11/2011 |

(Continued)

OTHER PUBLICATIONS

English translation of CN-110989096-B (Year: 2022).*

(Continued)

*Primary Examiner* — Uyen Chau N Le
*Assistant Examiner* — Darby M. Thomason
(74) *Attorney, Agent, or Firm* — Knobbe Martens Olson & Bear LLP

(57) ABSTRACT

An optical fiber adapter, relating to field of optical communication and comprising: a housing with a chamber having a first and second chamber connected with each other and respectively with two opposite ends of the housing; a retaining member integrally formed with the housing and provided within the first chamber, which is enclosed to form an receiving cavity having a first and second openings at one and other ends, respectively, and a third opening extending along a length direction of the retaining member; a retaining (Continued)

cover plate for detachably connecting to the retaining member to seal the third opening; and a ceramic sleeve provided within the receiving cavity and adjacent to the retaining cover plate, which has a third chamber connected with the first and second opening, and is limited within the receiving cavity. The retaining member is an integrated structure, improving the collimation performance of the adapter.

10 Claims, 11 Drawing Sheets

(56) References Cited

U.S. PATENT DOCUMENTS

| | | | | |
|---|---|---|---|---|
| 11,493,697 | B2* | 11/2022 | Luo | G02B 6/3825 |
| 2004/0072454 | A1 | 4/2004 | Nakajima et al. | |
| 2007/0297723 | A1* | 12/2007 | Flower | G02B 6/383 385/71 |
| 2014/0205241 | A1 | 7/2014 | Nielson | |
| 2015/0241641 | A1 | 8/2015 | Nelson | |
| 2016/0306122 | A1 | 10/2016 | Tong et al. | |

FOREIGN PATENT DOCUMENTS

| | | | | |
|---|---|---|---|---|
| CN | 202563125 U | | 11/2012 | |
| CN | 202916460 U | | 5/2013 | |
| CN | 103412376 A | | 11/2013 | |
| CN | 103713362 A | | 4/2014 | |
| CN | 105974531 A | | 9/2016 | |
| CN | 108603987 A | | 9/2018 | |
| CN | 208076765 U | | 11/2018 | |
| CN | 110989096 A | | 4/2020 | |
| CN | 111025491 A | | 4/2020 | |
| CN | 111708125 A | | 9/2020 | |
| CN | 110989096 B | * | 5/2022 | ........... G02B 6/3831 |
| JP | 2004-151670 A | | 5/2004 | |
| WO | WO 2017131717 A1 | | 8/2017 | |

OTHER PUBLICATIONS

International Search Report issued in International Application No. PCT/CN2020/138422, mailed on Mar. 22, 2021.
Search Report issued in Chinese Application No. 202010591832.0, dated Jan. 22, 2021.
Supplementary Search Report issued in Chinese Application No. 202010591832.0, dated Mar. 13, 2022.
Notice of Reasons for Refusal issued in Japanese Application No. 2022-574218, dated Jan. 9, 2024.

* cited by examiner

OPTICAL FIBER ADAPTER

CROSS-REFERENCE TO RELATED APPLICATION

The present disclosure claims the priority of a Chinese patent application No. 202010591832.0 filed on Jun. 24, 2020, the disclosure of which is hereby incorporated by reference herein in its entirety.

TECHNICAL FIELD OF THE DISCLOSURE

The present disclosure relates to the technical field of optical communication devices, and in particular, to an optical fiber adapter.

BACKGROUND

The optical fiber adapters are optical fiber movable connectors, also known as optical passive devices to realize movable connection between optical fibers, which have the function of movable connection between optical fibers and optical fibers, optical fibers and active devices, optical fibers and other passive devices, and optical fibers and instruments.

An associated optical fiber adapter includes a housing, a sleeve retaining member and a ceramic sleeve, wherein the sleeve retaining member is provided within the housing, and the ceramic sleeve is provided within the sleeve retaining member and is provided with through-holes for accommodating optical fibers. The optical fibers include a first optical fiber and a second optical fiber. The first optical fiber and the second optical fiber are inserted into the corresponding through-holes at both ends of the ceramic sleeve for docking, and the ceramic sleeve provides adjustment space through free floating thereof, so that the first optical fiber and the second optical fiber may be coaxially docked, thereby ensuring that a light beam in the first optical fiber is parallel to a light beam in the second optical fiber and the optical fiber adapter has good alignment performance. It should be noted that the collimation refers to keeping the light beam of the first optical fiber and the light beam of the second optical fiber parallel to each other.

The related sleeve retaining members are divided into a first sleeve retaining member and a second sleeve retaining member. One end of the ceramic sleeve is placed within a through-hole of the first sleeve retaining member, and the other end of the ceramic sleeve is placed within a through-hole of the second sleeve retaining member. The first sleeve retaining member and the second sleeve retaining member are performed coaxial alignment assembly to realize the coaxial docking of the through-holes. Due to the fact that errors exist in the assembly process, the sleeve retaining members are not completely coaxial during the actual alignment assembly, so that the ceramic sleeve is not be able to float freely within the through-hole of the sleeve retaining member, thereby affecting the collimation performance of the optical fiber adapter.

SUMMARY

Embodiments of the present disclosure provide an optical fiber adapter so as to solve the technical problem of how to improve the collimation performance of the optical fiber adapter.

In order to achieve the above-mentioned purpose, the technical solutions of the present disclosure are realized as follows.

The embodiments of the present disclosure provide an optical fiber adapter, comprising: a housing provide with a chamber, wherein the chamber comprises a first chamber and a second chamber which are in communication with each other and are respectively in communication with two opposite ends of the housing; a retaining member, which is integrally formed with the housing and is provided within the first chamber, wherein the retaining member is enclosed to form an receiving cavity, and the receiving cavity has a first opening located at one end of the retaining member, a second opening located at the other end of the retaining member, and a third opening extending along a length direction of the retaining member; a retaining cover plate, which is used for detachably connected to the retaining member to seal the third opening; and a ceramic sleeve, which is provided within the receiving cavity and is adjacent to the retaining cover plate, wherein the ceramic sleeve has a third chamber in communication with the first opening and the second opening, and the ceramic sleeve is limited within the receiving cavity.

Further, the third opening comprises: a long side which comprises a first long side and a second long side both parallel to the length-extending direction of the retaining member; a short side which is perpendicular to the long side and comprises a first short side connected to one end of the first long side and one end of the second long side, and a second short side connected to the other end of the first long side and the other end of the second long side.

Further, lengths of both the first long side and the second long side are greater than a length of the ceramic sleeve.

Further, a distance between the first long side and the second long side is greater than an outer diameter of the ceramic sleeve.

Further, the optical fiber adapter further comprises a blocking member which is integrally formed with the housing and which comprises a first blocking member located at said one end of the retaining member and a second blocking member located at the other end of the retaining member; wherein the first blocking member has a first through-hole in communication with the first opening, and the second blocking member has a second through-hole in communication with the second opening.

Further, apertures of both the first through-hole and the second through-hole are smaller than the outer diameter of the ceramic sleeve.

Further, a length of the retaining cover plate is the same as a length of the long side.

Further, the retaining cover plate has an outer surface and an inner surface opposite each other, wherein the inner surface of the retaining cover plate is used for sealing the third opening, and the outer surface of the retaining cover plate is in a smooth transition with the outer surface of the retaining member.

Further, the optical fiber adapter further includes a handle which is provided on the outer surface of the retaining cover plate and is fixedly connected with the retaining cover plate.

Further, the handle and the retaining cover plate are both provided within the chamber and adjacent to the housing.

Further, the retaining member is integrally formed with the housing, and the retaining member penetrates the first chamber; wherein the retaining member is enclosed to form an receiving cavity, and the retaining member has a first opening located at the one end, a second opening located at the other end, and a third opening extending along the length-extending direction of the retaining member; and the first opening, the second opening and the third opening are all in communication with the receiving cavity.

The optical fiber adapter provided by the present disclosure comprises a housing, a retaining member, a retaining cover plate and a ceramic sleeve, wherein the retaining member is enclosed to form a receiving cavity used for placing the ceramic sleeve, wherein the receiving cavity has a first opening, a second opening and a third opening, and the retaining cover plate is detachably connected with the retaining member to seal the third opening. By providing the third opening in the length-extending direction of the retaining member, the ceramic sleeve may be placed within the receiving cavity which is formed with the enclosed retaining member through the third opening, and the retaining cover plate may seal the third opening and be detachably connected with the retaining member. The retaining member is an integrated structure, and the retaining member is integrally formed with the housing. an axis of the retaining member is an axis of the integrated structure per se, which prevents the problem that multiple retaining members are not coaxial with each other due to assembly errors, and which ensures that the ceramic sleeve may float freely within the retaining member. As a result, when the optical fibers are inserted into both ends of the ceramic sleeve for docking, the coaxial docking between the optical fibers is ensured, so that the optical fiber adapter has good alignment performance.

BRIEF DESCRIPTION OF THE DRAWINGS

In order to more clearly explain the embodiments of the present disclosure or the technical solutions in the prior art, the drawings required in the embodiments of the present disclosure or the description of the prior art are briefly introduced in the followings.

DESCRIPTION OF THE REFERENCE SIGNS 1-sleeve retaining member
11-first cavity
121-first inlet
122-second inlet
131-first sleeve retaining member
1311-first receiving cavity
132-second sleeve retaining member
1321-second receiving cavity
2-housing
21-chamber
22-chamber
221-first chamber
222-second chamber
3-ceramic sleeve
31-second cavity
321-third inlet
322-fourth inlet
33-third chamber
4-retaining member
41-receiving cavity
421-first opening
422-second opening
43-third opening
431-long side
4311-first long side
4312-second long side
432-short side
4321-first short side
4322-second short side
5-retaining cover plate
6-blocking member
61-first blocking member
611-first through-hole
62-second blocking member
621-second through-hole
7-handle

DETAILED DESCRIPTION

In order to make the objectives, technical solutions and advantages of the present disclosure clearer, the following further describes the present disclosure in detail in combination with the drawings and embodiments. It should be understood that the specific embodiments described herein are merely used to explain the present disclosure, not to limit the present disclosure.

Each specific technical feature described in the specific embodiments, may be combined in any suitable way without contradiction, for example, different embodiments and technical solutions may be formed by the combination of different specific technical features. In order to prevent unnecessary repetition, the various possible combinations of each specific technical feature in the present disclosure will not be described separately.

In the following description, the terms "first\ second\ . . . " merely distinguish different objects and do not indicate similarities or connections between each object. It should be understood that both the orientation descriptions "above" and "below" are the orientation in normal usage.

It should be noted that the terms "including", "comprising" or any other variation thereof are intended to cover non-exclusive inclusions, such that a process, method, article, or apparatus comprising a series of elements includes not only those elements, but also other elements that are not explicitly listed, or elements inherent to such process, method, article or apparatus. Without further limitation, an element defined by the statement "including a . . . " does not exclude the existence of another identical element in a process, method, article or apparatus that includes that element.

An optical fiber adapter provided in the embodiments of the present disclosure is mainly used for optical passive devices which realize movable connection between equipment, between equipment and instruments, between equipment and optical fibers (or optical cable), and between optical fibers (or optical cable) and optical fibers (or optical cable), in optical communication systems.

Figure 1:
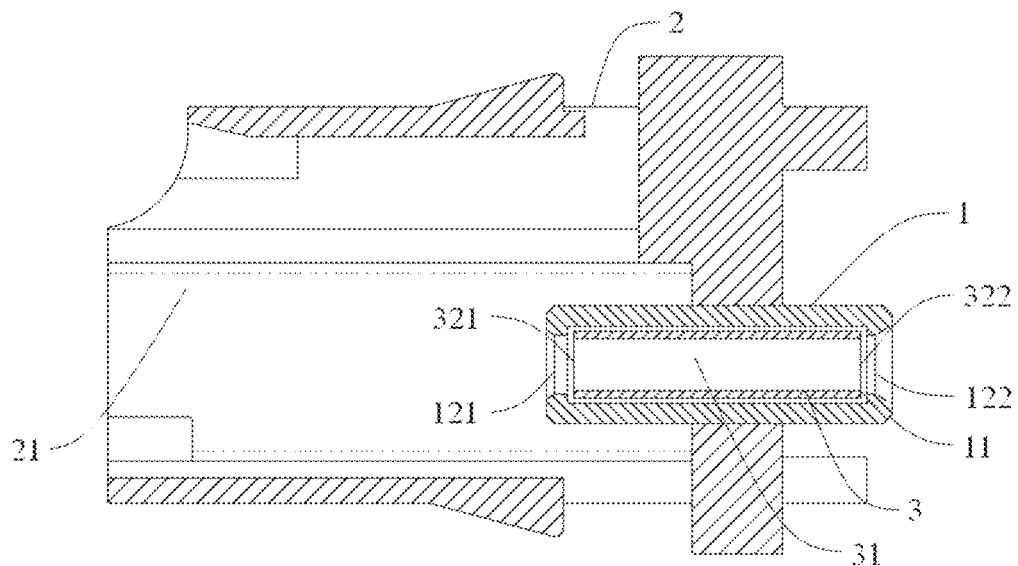
FIG. 1 is a schematic diagram of a working principle of a related optical fiber adapter.

An application of the optical fiber adapter to a connector is used as an example, and it should be noted that the type of application scene of the present disclosure is not limited to the present disclosure. The working principle of the optical fiber adapter is exemplarily illustrated combined with FIG. 1. The optical fiber adapter may include a sleeve retaining member 1, a housing 2, and a ceramic sleeve 3. The housing 2 may be an approximate cube structure, wherein one end of the housing 2 is an opening end, and thus the housing 2 forms a chamber 21 through enclosure. The end face of the other end opposite to the opening end is provided with a through-hole, and the area of the through-hole is much smaller than that of the end face. The sleeve retaining member 1 is inserted into the chamber of the housing 2 through the through-hole, and along a length-extending direction of the sleeve retaining member 1, one end of the sleeve retaining member 1 is located within the chamber, while the opposite other end of the sleeve retaining member 1 protrudes from the outer surface of the housing 2. The sleeve retaining member 1 may be an approximately cylindrical structure, and the sleeve retaining member 1 has a penetrating first cavity 11. One end of the sleeve retaining member 1 is provided with a first inlet 121, and the opposite other end is provided with a second inlet 122. Both the first inlet 121 and the second inlet 122 are in communication with the first cavity 11. The first cavity 11 is used for placing the ceramic sleeve 3. The ceramic sleeve 3 has a second cavity 31. One end of the ceramic sleeve 3 is provided with a third inlet 321, and the opposite other end is provided with a fourth inlet 322. Both the third inlet 321 and the fourth inlet 322 are in communication with the second cavity 31, and the first cavity 31 is used for placing the ceramic ferrule. A standard connector is inserted into the chamber 21 from the opening end of the housing 2 and is connected with the end of the sleeve retaining member 1 close to the first inlet 121. A ceramic pin of the standard connector is inserted into the first inlet 121, and an optical fiber core within the ceramic pin is inserted into the ceramic ferrule. A miniature connector is accessed from the other end opposite to the opening end of the housing 2 and is connected with one end of the sleeve retaining member 1 close to the second inlet 122. The ceramic pin of the miniature connector is inserted into the second inlet [121] 122, and an optical fiber core within the ceramic pin is inserted into the ceramic ferrule, and then is connected with the optical fiber core of the standard connector. The optical fiber adapter is connected with the optical fiber core between the standard connector and the miniature connector through the sleeve retaining member 1, and the housing 2, the ceramic sleeve 3 and other assemblies to realize docking and transmission of the optical path.

Figure 2:
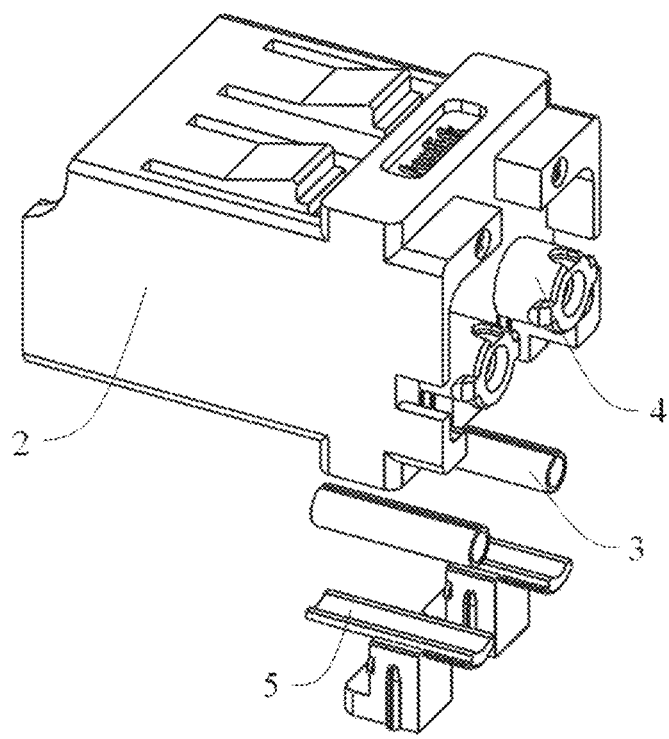
FIG. 2 is a schematic explosive view of an optical fiber adapter according to an embodiment of the present disclosure.
Figure 3:
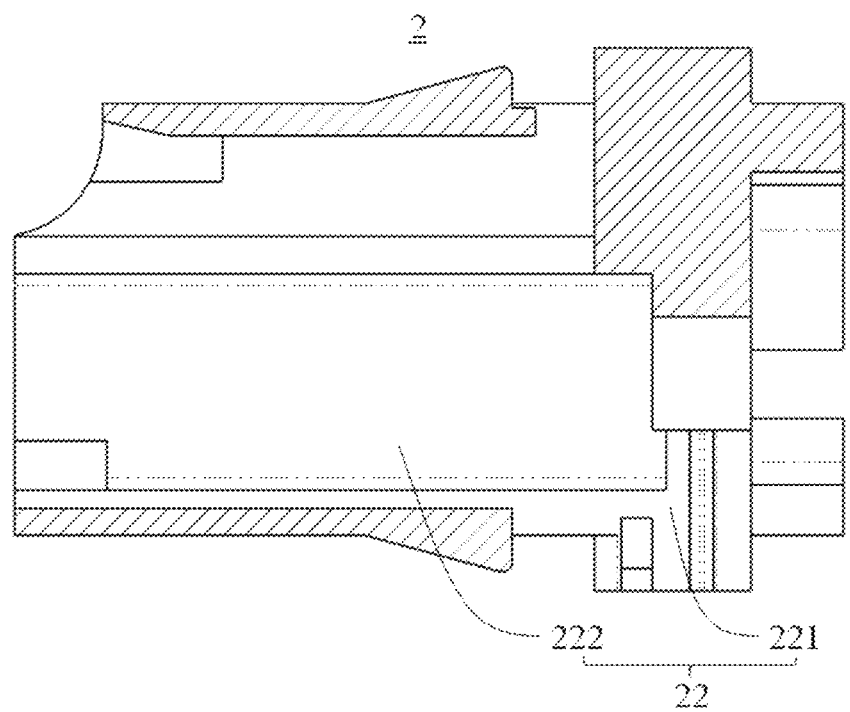
FIG. 3 is a schematic cross-sectional view of a housing of an optical fiber adapter according to an embodiment of the present disclosure.
Figure 4:
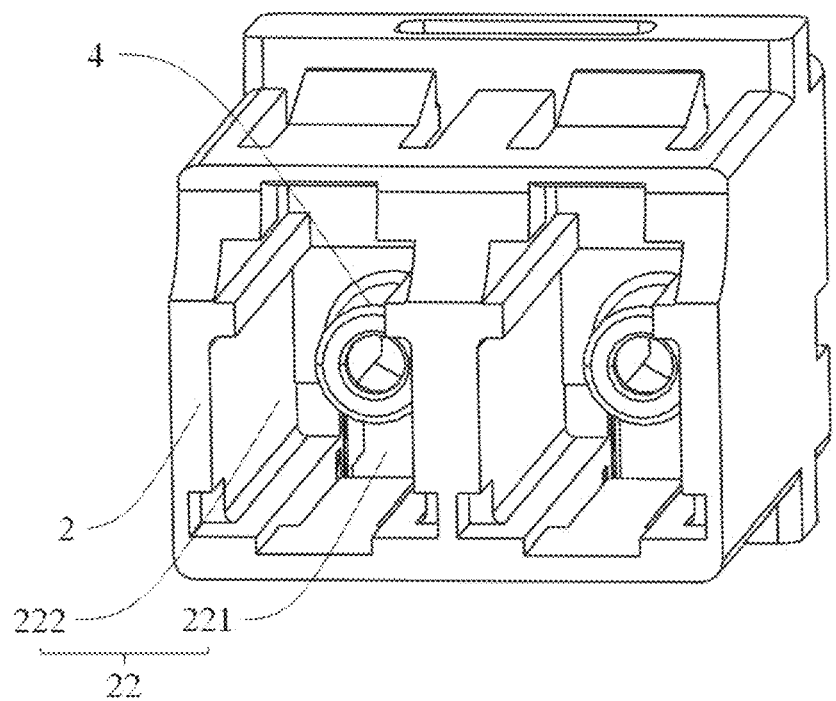
FIG. 4 is a schematic rear view of an optical fiber adapter according to an embodiment of the present disclosure.
Figure 5A:
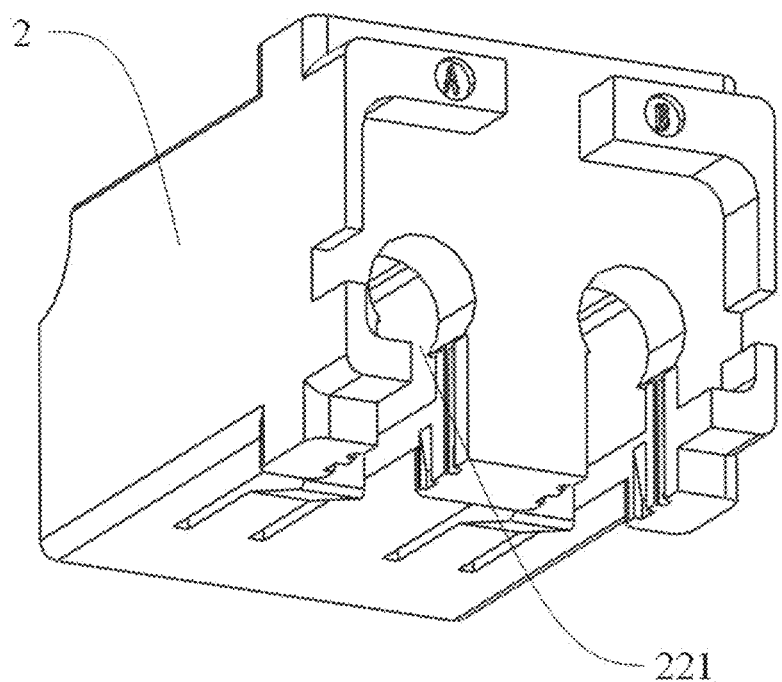
FIG. 5a is a schematic structural diagram of a housing of an optical fiber adapter according to an embodiment of the present disclosure.
Figure 5B:
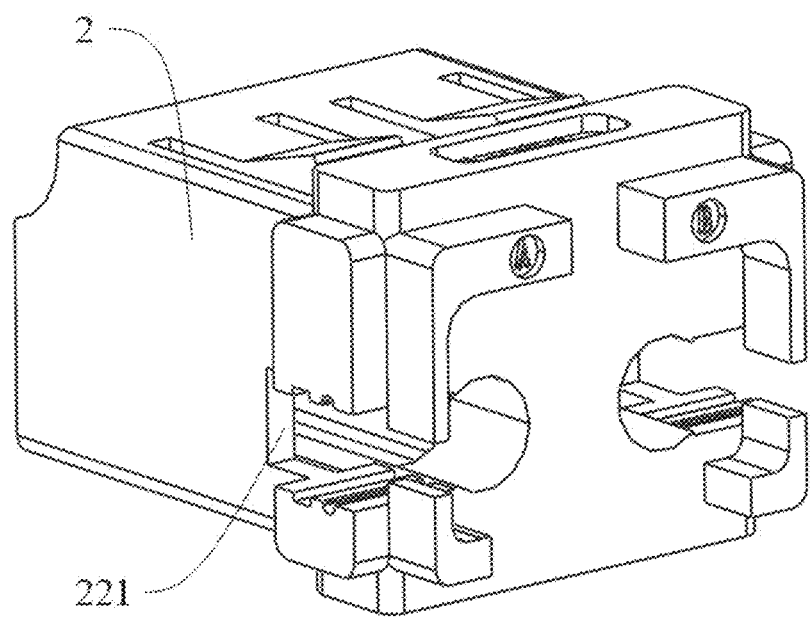
FIG. 5b is a schematic structural diagram of a housing of another optical fiber adapter according to an embodiment of the present disclosure.
Figure 5C:
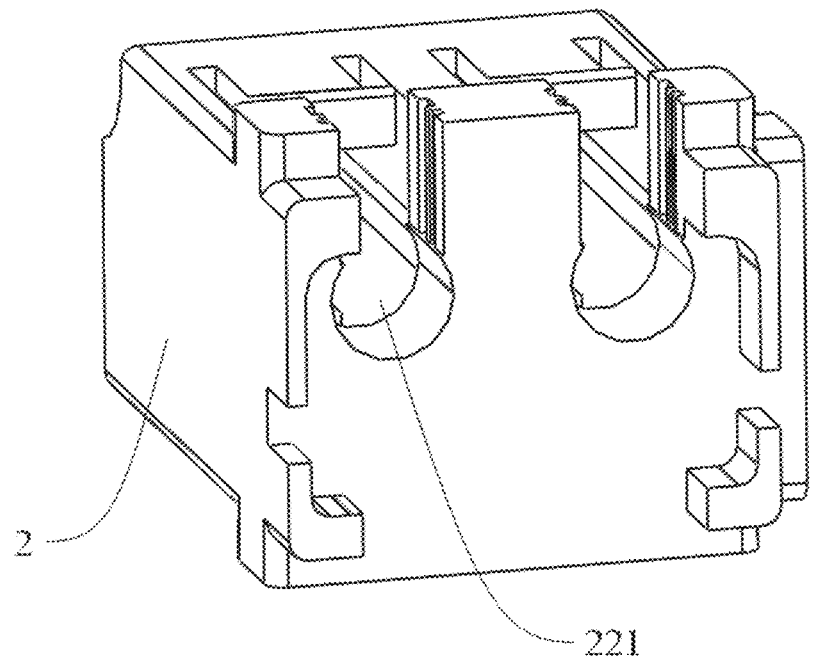
FIG. 5c is a schematic structural diagram of a housing of another optical fiber adapter according to an embodiment of the present disclosure.

In the embodiments of the present disclosure, as shown in FIG. 2 and FIG. 3, the optical fiber adapter includes a housing 2, a ceramic sleeve 3, a retaining member 4 and a retaining cover plate 5, wherein the housing 2 has a chamber 22, and the chamber 22 comprises a first chamber 221 and a second cavity 222 which are in communication with each other and which are respectively in communication with the opposite two ends of the housing 2. Specifically, the housing 2 may be an approximate cube thin-walled structure, as shown in FIG. 4, one end of the housing 2 is an opening end for inserting the retaining member 4, and the other end face opposite to the opening end and the four side faces of the housing 2 form the second chamber 222 through enclosure for accommodating the interface end of the standard connector. As shown in FIG. 3, the first chamber 221 is communicated with the second chamber 222, and the first chamber 221 is used for placing the retaining member 4. Optionally, as shown in FIG. 5a, the first chamber 221 may be provided at the connection area of the end face of the housing 2 and the lower side face of the housing 2; as shown in FIG. 5b, the first chamber 221 may also be provided at the connection area of the end face of the housing 2 and the left (right) side face of the housing 2; as shown in FIG. 5c, the first chamber 221 may also be provided at the connection area of the end face of the housing 2 and the upper side face of the housing 2. Preferably, in an embodiment of the present disclosure, the first chamber 221 uses the structure shown in FIG. 5a for subsequent description. From the first chamber 221 to the second chamber 222, the volume of the chamber increases, and together forms the chamber 22.

Figure 6:
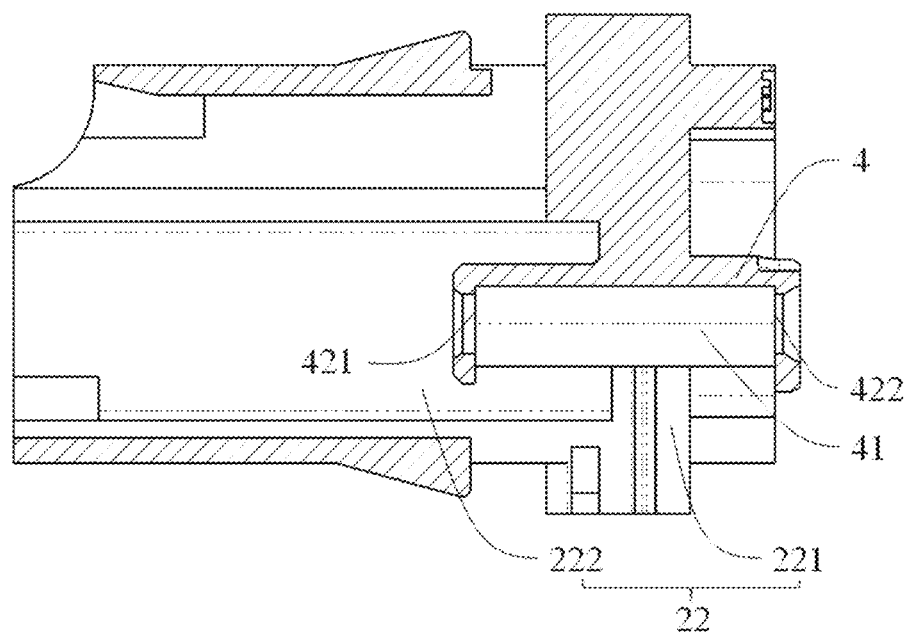
FIG. 6 is a schematic cross-sectional view of a housing and a retaining member of an optical fiber adapter according to an embodiment of the present disclosure.
Figure 7:
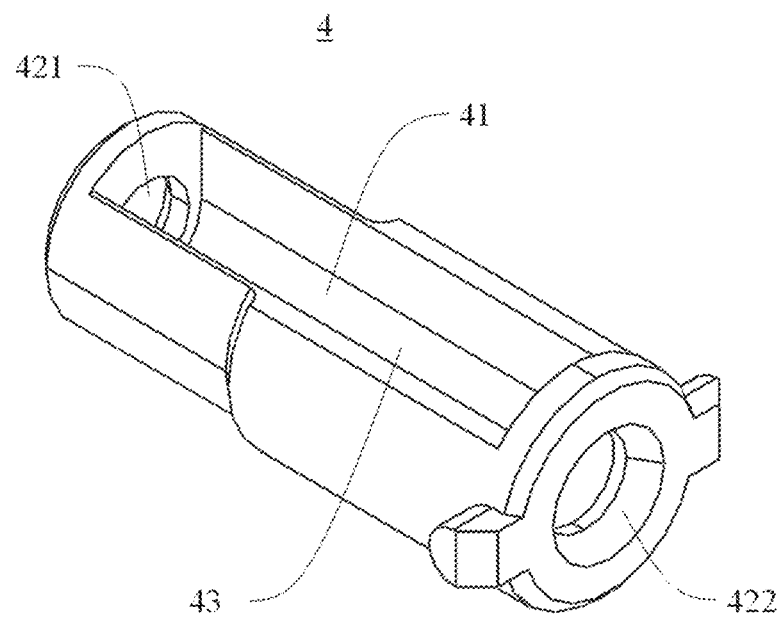
FIG. 7 is a schematic structural diagram of a retaining member of an optical fiber adapter according to an embodiment of the present disclosure.
Figure 8:
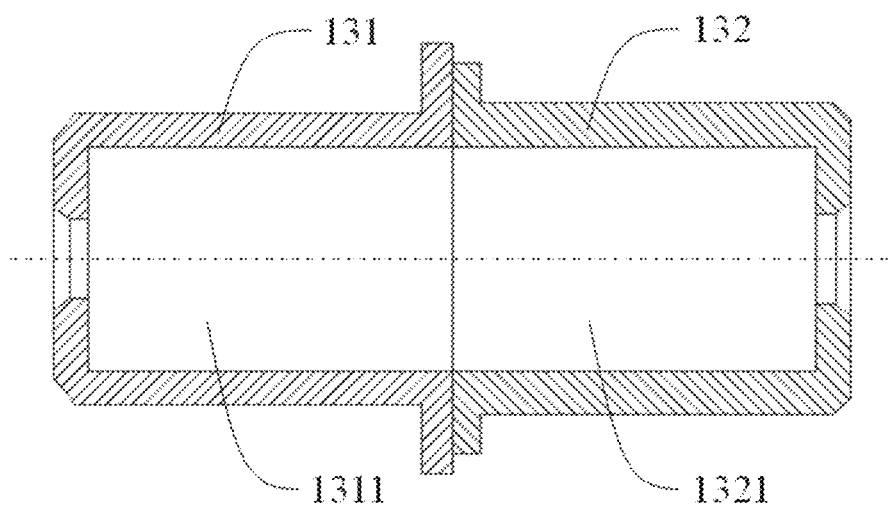
FIG. 8 is a schematic structural diagram of a sleeve retaining member of a related optical fiber adapter.

As shown in FIGS. 6 and 7, the optical fiber adapter further comprises a retaining member 4 which is integrally formed with the housing 2 and is provided within the first chamber 221, wherein the retaining member 4 is enclosed to form a receiving cavity 41, and the receiving cavity 41 has a first opening 421 located at one end, a second opening 422 located at the other end, and a third opening 43 extending along a length-extending direction of the retaining member 4. Specifically, the retaining member 4 and the housing 2 are an integrally formed structure, which may prevent the problem that an assembled structure needs to be welded or bonded, and may also prevent the non-coaxial problem caused by the deflection of the retaining member 4 during the assembly process. The retaining member 4 may be inserted into the second chamber 222 along the first chamber 221, and one end of the retaining member 4 may be connected with a standard connector terminal inserted into the second chamber 222, and the other end of the retaining member 4 is connected with a miniature connector terminal outside the housing 2. The setting form of the retaining member 4 is flexible and diverse; for example, the retaining member 4 may be located entirely within the chamber 22, or the retaining member 4 may also be partially provided within the second chamber 222 and the other portion protrudes from the housing 2. It should be noted that the relative position relationship between the retaining member 4 and the housing 2 does not limit the present disclosure. In an exemplary embodiment, a setting mode as shown in FIG. 6 may be used; that is, one portion of the retaining member 4 is located within the housing 2, and the other portion is located outside the housing 2. As shown in FIG. 7, the retaining member 4 may be an approximately cylindrical barrel having one side face and two opposite end faces, and a space formed through enclosure of the side face and the two end faces of the barrel is just the receiving cavity 41. Along a length-extending direction of the barrel, a third opening 43 is provided at a side face of the barrel, as an inlet for placing the ceramic sleeve 3, and along a circumferential direction of the barrel, the third opening 43 can be provided at any position of the side face of the barrel. The two end faces of the barrel are correspondingly provided with a first opening 421 and a second opening 422 respectively, so that the ceramic pins of the connectors located at the two ends of the retaining member 4 can extend into the receiving cavity 41. The retaining member 4 is an integrally formed structure, and the ceramic sleeve 3 may be inserted into and placed within the receiving cavity 41 of the retaining member 4 through the third opening 43 in a radial direction of the retaining member 4. A central axis of the barrel is just an axis of the retaining member 4, and there is only one such axis. The ceramic sleeve 3 may be coaxial with the retaining member 4, and the ceramic sleeve 3 may float freely within the retaining member 4. As shown in FIG. 8, the related sleeve retaining member includes a first sleeve retaining member 131 and a second sleeve retaining member 132. The first sleeve retaining member 131 has a first receiving cavity 1311, and the second sleeve retaining member 132 has a second receiving cavity 1321. One end of the ceramic sleeve 3 is inserted into the first receiving cavity 1311, and the opposite other end of the ceramic sleeve 3 is inserted into the second receiving cavity 1321. The first receiving cavity 1311 and the second receiving cavity 1321 together form a space for placing the ceramic sleeve 3. The first sleeve retaining member 131 and the second sleeve retaining member 132 are connected by coaxial alignment assembly to form the sleeve retaining member. Since there are certain errors in the actual assembly process, an axis of the first sleeve retaining member 131 and an axis of the second sleeve retaining member 132 are not on the same straight line, and the cavity formed by the first receiving cavity 1311 and the second receiving cavity 1321 is deflected to a certain extent. As a result, the ceramic sleeve is not able to float freely within the receiving cavity, and when the first optical fiber and the second optical fiber are inserted into the corresponding through-holes at both ends of the ceramic sleeve 3 for docking, the first optical fiber and the second optical fiber cannot be coaxially docked, thereby affecting the collimation performance of the optical fiber adapter. On the one hand, the retaining member 4 of the embodiment of the present disclosure provides a space capable of placing the ceramic sleeve. On the other hand, the retaining member 4 is an integrated structure and is integrally formed with the housing 2, and the axis of the retaining member 4 is the axis of the above-mentioned integrated structure per se, which prevents the problem that multiple sleeve retaining members are not coaxial with each other due to assembly errors, thereby maintaining the floatability of the ceramic sleeve and improving the collimation performance of the optical fiber adapter.

Figure 9:
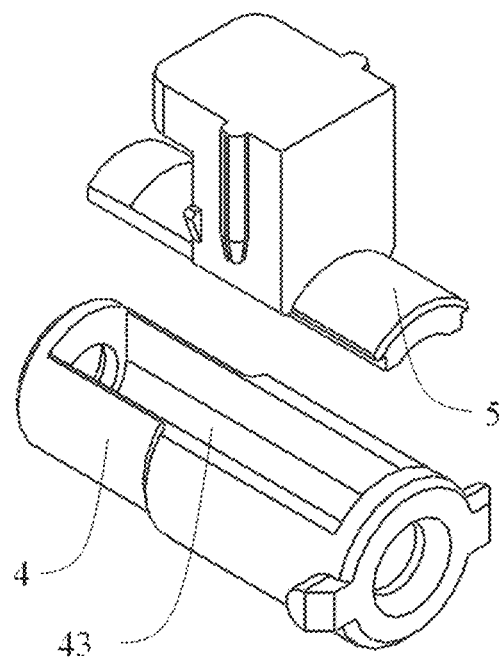
FIG. 9 is a schematic structural diagram of a sleeve retaining member and a retaining cover plate of an optical fiber adapter according to an embodiment of the present disclosure.

As shown in FIG. 9, the optical fiber adapter further includes a retaining cover plate 5 used for detachably connecting to the retaining member 4 to seal the third opening 43. Specifically, the ceramic sleeve is placed into the receiving cavity of the retaining member 4 from the third opening 43, one side of the ceramic sleeve close to the third opening 43 being exposed, and the retaining cover plate 5 may approximately cover the third opening 43 of the retaining member 4, providing shielding and protection for the exposed portion of the ceramic sleeve. The retaining cover plate 5 is connected with the retaining member 4 to prevent the ceramic sleeve from falling off from the third opening 43 of the retaining member 4. The structure size of the retaining cover plate 5 is adapted to the size of the third opening 43, so that good fit between the retaining cover plate 5 and the third opening 43 may be ensured, and the retaining cover plate 5 and the retaining member 4 are not fixedly connected between each other, which facilitates the ceramic sleeve be conveniently placed in and taken out.

Figure 10:
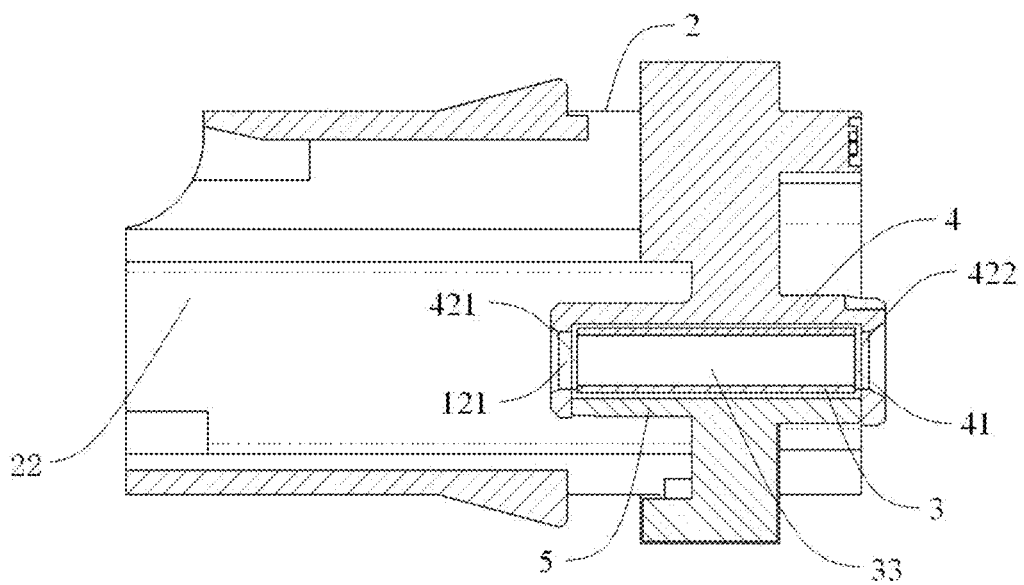
FIG. 10 is a schematic cross-sectional view of an optical fiber adapter according to an embodiment of the present disclosure.

As shown in FIG. 10, the optical fiber adapter further comprises a ceramic sleeve 3 which is provided within the receiving cavity 41 and is adjacent to the retaining cover plate 5, and the ceramic sleeve 3 has a third chamber 33 in communication with the first opening 421 and the second opening 422. In addition, the ceramic sleeve 3 is limited within the receiving cavity 41. It should be noted that the ceramic sleeve being limited in the receiving cavity 41 means that the ceramic sleeve 3 may float within the receiving cavity 41 to a certain extent, because there is a gap between the ceramic sleeve 3 and the retaining member 4. However, the ceramic sleeve 3 cannot move beyond the receiving cavity 41. The ceramic pins of the connectors connected with the two ends of the retaining member 4 are correspondingly inserted into the first opening 421 and the second opening 422, and then the optical fiber core within the ceramic pin are inserted into the ceramic ferrule of the third chamber 33.

The retaining member 4 of the embodiment of the present disclosure is integrally formed with the housing 2, and provided the third opening 43 in the length direction of the retaining member 4. Through the third opening 43, the ceramic sleeve 3 may be placed within the receiving cavity 41 which is formed with the enclosure of the retaining member 4, and the retaining cover plate 5 may seal the third opening 43 and be detachably connected with the retaining member 4. The retaining member 4 is an integrated structure, which does not need coaxial alignment assembly, thus eliminating the collimation performance defects caused by multiple retaining members being non-coaxial.

Figure 11:
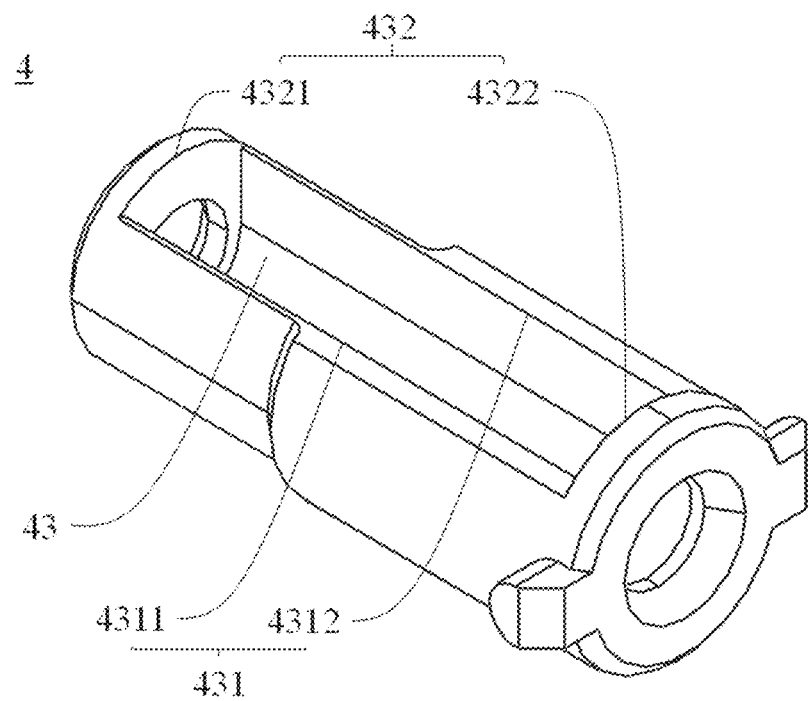
FIG. 11 is a schematic structural diagram of a retaining member of an optical fiber adapter according to an embodiment of the present disclosure.

In some embodiments, as shown in FIG. 11, the third opening 43 comprises a long side 431 and a short side 432, wherein the long side 431 comprises a first long side 4311 and a second long side 4312 which are both parallel to the length-extending direction of the retaining member 4; and the short side 432 is perpendicular to the long side 431, and comprises a first short side 4321 connected to one end of the first long side 4311 and one end of the second long side 4312, and a second short side 4322 connected to the other end of the first long side 4311 and the other end of the second long side 4312. Specifically, the ceramic sleeve 3 may be an approximately cylindrical structure, and along the length-extending direction of the ceramic sleeve 3, the diameters of the ceramic sleeve 3 from one end to the opposite other end are approximately the same; the first long side 4311 and the second long side 4312 of the third opening 43 are both parallel to the axis of the retaining member 4, i.e. a distance between the first long side 4311 and the second long side 4312 is constant, so that the ceramic sleeve 3 is conveniently placed into the receiving cavity of the retaining member 4 through the third opening 43.

Figure 12:
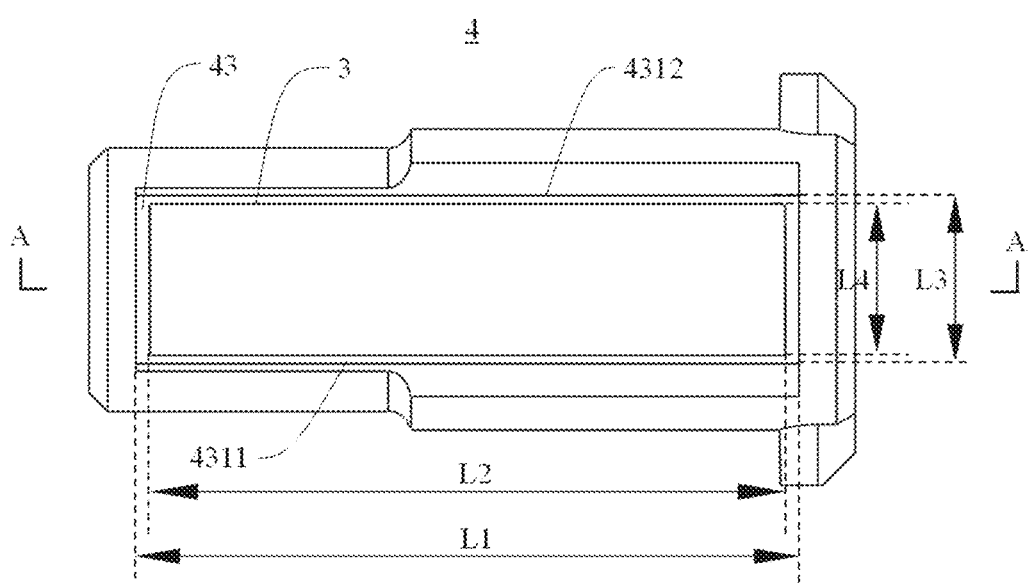
FIG. 12 is a schematic top view of a retaining member of an optical fiber adapter according to an embodiment of the present disclosure.

In some embodiments, as shown in FIG. 12, the lengths L1 of both the first long side 4311 and the second long side 4312 are greater than the length L2 of the ceramic sleeve 3. Specifically, the lengths of the first long side 4311 and the second long side 4312 both are L1, and L1 is greater than the length L2 of the ceramic sleeve 3, so that the ceramic sleeve 3 can be placed into the receiving cavity in the length direction of the third opening 43 of the retaining member 4.

In some embodiments, as shown in FIG. 12, a distance L3 between the first long side 4311 and the second long side 4312 is greater than an outer diameter L4 of the ceramic sleeve 3. Specifically, L3 is greater than L4, so that the ceramic sleeve 3 can be placed into the receiving cavity in the width direction of the third opening 43 of the retaining member 4.

Figure 13:
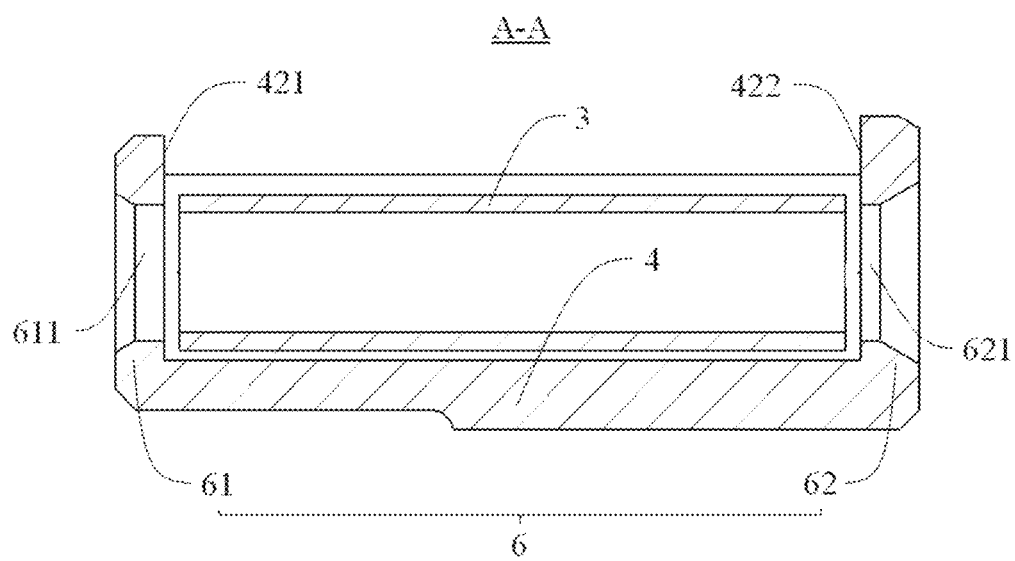
FIG. 13 is a schematic cross-sectional view of the optical fiber adapter shown in FIG. 12 taken along an A-A direction.
Figure 14A:
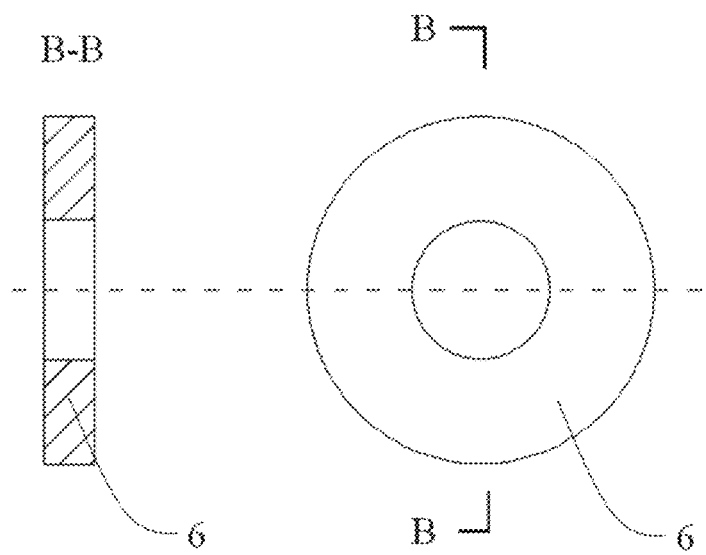
FIG. 14a is a schematic structural diagram of a blocking member of an optical fiber adapter.
Figure 14B:
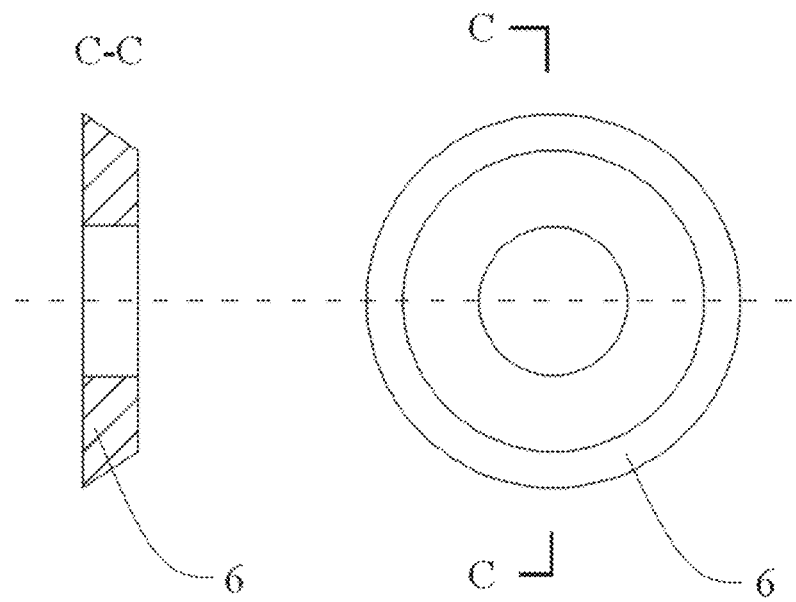
FIG. 14b is a schematic structural diagram of a blocking member of another optical fiber adapter.

In some embodiments, as shown in FIG. 13, the optical fiber adapter further comprises a blocking member 6 which is integrally formed with the housing 2 and which comprises a first blocking member 61 located at one end of the retaining member 4 and a second blocking member 62 located at the other end of the retaining member 4; wherein the first blocking member 61 has a first through-hole 611 in communication with the first opening 421, and the second blocking member 62 has a second through-hole 621 in communication with the second opening 422. Specifically, as mentioned above, the ceramic sleeve 3 cannot move beyond the receiving cavity 41, and the blocking members 6 may be provided at both ends of the retaining member 4 in the length-extending direction of the retaining member 4 for limiting the movement of the ceramic sleeve 3 and blocking the ceramic sleeve 3 from sliding out of both ends of the retaining member 4. The blocking member 6 and the retaining member 4 are an integrated structure, and the shape of the blocking member 6 is arbitrary; for example, the shape of the blocking member 6 may be a cylindrical-shaped circular structure as shown in FIG. 14*a*, or a round-shaped circular structure as shown in FIG. 14*b*. The approximate center area of the blocking member 6 is provided with through-holes, including a first through-hole 611 and a second through-hole 621, for inserting the ceramic pins of the connectors.

In some embodiments, as shown in FIG. 13, apertures of both the first through-hole 611 and the second through-hole 621 are smaller than the outer diameter of the ceramic sleeve 3. Specifically, the apertures of the first through-hole 611 and the second through-hole 621 may be the same or different, and in the first through-hole 611 and the second through-hole 621, the aperture with the minimum size should be smaller than the outer diameter of the ceramic sleeve 3, which may block the ceramic sleeve 3 from sliding out along the axial direction of the retaining member 4.

Figure 15:
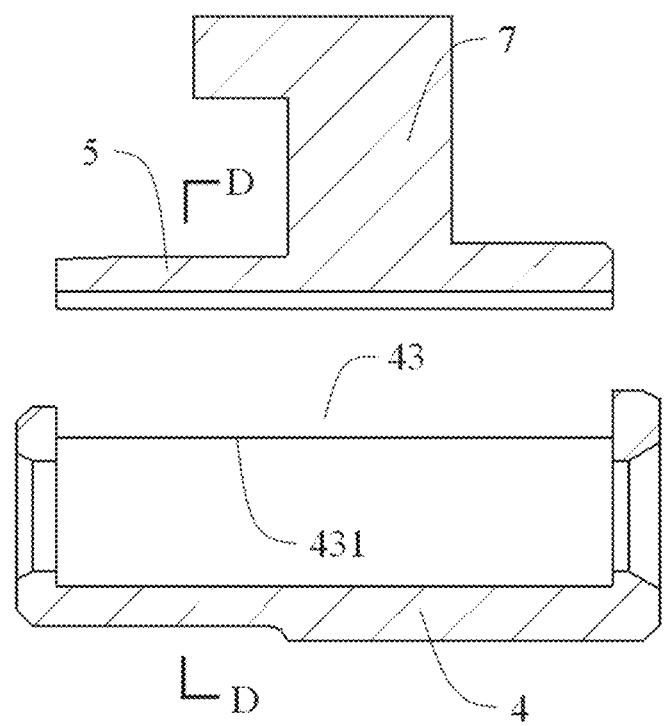
FIG. 15 is a schematic cross-sectional view of a sleeve retaining member and a retaining cover plate of an optical fiber adapter according to an embodiment of the present disclosure.

In some embodiments, as shown in FIG. 15, the length of the retaining cover plate 5 is the same as the length of the long side 431. Specifically, the retaining cover plate 5 approximately covers the third opening 43 of the retaining member 4, and the retaining cover plate 5 may maintain a better fit with the retaining member 4, while also providing shielding and protection for the ceramic sleeve 3.

Figure 16:
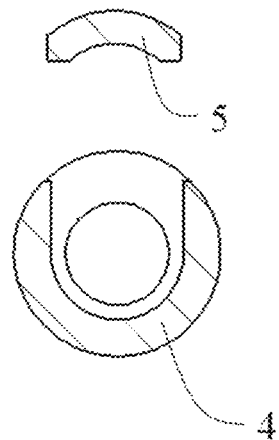
FIG. 16 is a schematic cross-sectional view of FIG. 15 in a D-D direction.

In some embodiments, as shown in FIG. 16, the retaining cover plate 5 has an outer surface and an inner surface opposite each other, wherein the inner surface of the retaining cover plate 5 is used for sealing the third opening 43, and the outer surface of the retaining cover plate 5 is in a smooth transition with the outer surface of the retaining member. Specifically, considering the adaptability and appearance of the process, the retaining cover plate 5 may be an arc-shaped cover plate, and may form a complete cylindrical structure with the retaining member 4 after being connected with the retaining member 4.

In some embodiments, as shown in FIG. 15, the optical fiber adapter further includes a handle 7, and the handle 7 is provided on the outer surface of the retaining cover plate 5 and is fixedly connected with the retaining cover plate 5. Specifically, the handle 7 is provided to enable the retaining cover plate 5 to be more convenient in the assembly or disassembly with the retaining member 4.

Figure 17:
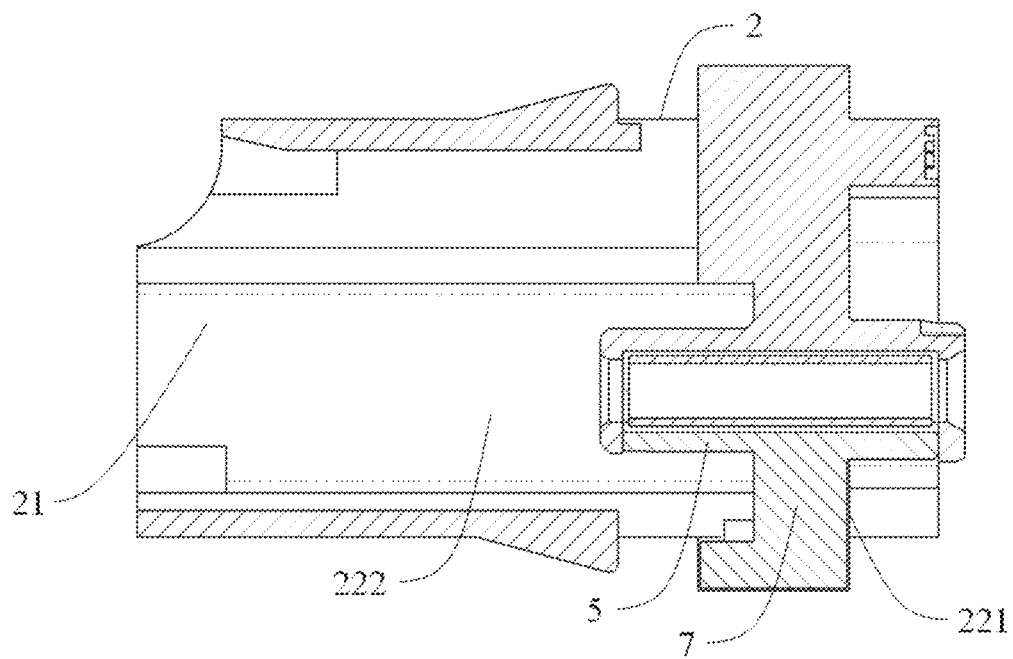
FIG. 17 is a schematic cross-sectional view of an optical fiber adapter according to an embodiment of the present disclosure.
Figure 18:
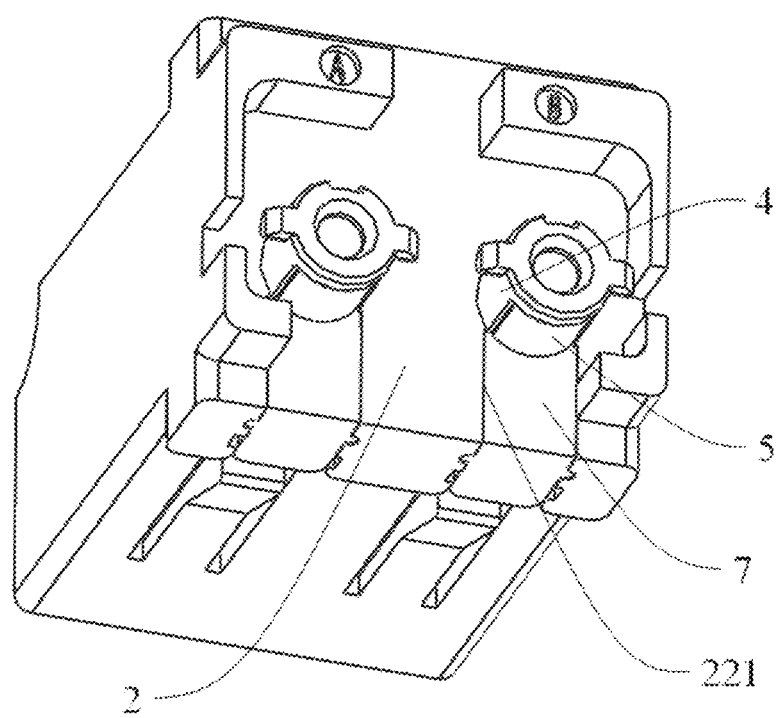
FIG. 18 is a three-dimensional schematic structural diagram of an optical fiber adapter according to an embodiment of the present disclosure.

In some embodiments, as shown in FIG. 17 and FIG. 18, the handle 7 and the retaining cover plate 5 are both provided within the chamber 22 and adjacent to the housing 2. Specifically, the handle 7 and the retaining cover plate 5 may be provided within the first chamber 221 together with the retaining member 4, and the housing 2 may provide a certain clamping effect for the handle 7, so that the handle 7 is clamped and fixed on the housing 2.

The above are merely preferred embodiments of the present disclosure and are not intended to limit the protection scope of the present disclosure.

What is claimed is:

1. An optical fiber adapter, comprising:
a housing provided with a chamber, wherein the chamber comprises a first chamber and a second chamber which are in communication with each other and which are respectively in communication with two opposite ends of the housing, and the first chamber extends to an end face of the housing and to a side face of the housing;
a retaining member, which is integrally formed with the housing and is provided within the first chamber, wherein the retaining member is enclosed to form a receiving cavity, and the receiving cavity has a first opening located at one end of the retaining member, a second opening located at the other end of the retaining member, and a third opening extending along a length direction of the retaining member;
a retaining cover plate, which is used for detachably connecting to the retaining member to seal the third opening;
a ceramic sleeve, which is provided within the receiving cavity and is adjacent to the retaining cover plate, wherein the ceramic sleeve has a third chamber in communication with the first opening and the second opening, and the ceramic sleeve is limited within the receiving cavity; and
a handle which is provided on an outer surface of the retaining cover plate and is fixedly connected with the retaining cover plate, and which is disposed in the first chamber and adjacent to an end surface of the housing.

2. The optical fiber adapter of claim 1, wherein the third opening comprises:
a pair of long sides, wherein the long sides comprise a first long side and a second long side, which are both parallel to the length-extending direction of the retaining member; and a pair of short sides, wherein the short sides are perpendicular to the long sides, respectively, and, comprise a first short side connected to one end of the first long side and one end of the second long side, and a second short side connected to the other end of the first long side and the other end of the second long side.

3. The optical fiber adapter of claim 2, wherein lengths of both the first long side and the second long side are greater than a length of the ceramic sleeve.

4. The optical fiber adapter of claim 2, wherein a distance between the first long side and the second long side is greater than an outer diameter of the ceramic sleeve.

5. The optical fiber adapter of claim 2, wherein a length of the retaining cover plate is the same as a length of the long sides.

6. The optical fiber adapter of claim 1, wherein the optical fiber adapter further comprises a blocking member, which is integrally formed with the housing and comprises a first blocking member located at the one end of the retaining member and a second blocking member located at the other end of the retaining member, wherein the first blocking member has a first through-hole in communication with the first opening, and the second blocking member has a second through-hole in communication with the second opening.

7. The optical fiber adapter of claim 6, wherein apertures of both the first through-hole and the second through-hole are smaller than an outer diameter of the ceramic sleeve.

8. The optical fiber adapter of claim 1, wherein the retaining cover plate has an outer surface and an inner surface opposite each other, wherein the inner surface of the retaining cover plate is used for sealing the third opening, and the outer surface of the retaining cover plate is in a smooth transition with the outer surface of the retaining member.

9. The optical fiber adapter of claim 1, wherein the handle and the retaining cover plate are both provided within the chamber of the housing and adjacent to the housing.

10. The optical fiber adapter of claim 1, wherein the retaining member penetrates the first chamber; and the first opening, the second opening and the third opening all are in communication with the receiving cavity.

* * * * *